United States Patent
Sato

(10) Patent No.: US 8,179,512 B2
(45) Date of Patent: May 15, 2012

(54) LIQUID CRYSTAL DISPLAY DEVICE HAVING PARTICULAR PIXEL STRUCTURE TO DECREASE PARASITIC CAPACITANCE

(75) Inventor: Naofumi Sato, Hyogo-ken (JP)

(73) Assignee: Toshiba Mobile Display Co., Ltd., Tokyo (JP)

( * ) Notice: Subject to any disclaimer, the term of this patent is extended or adjusted under 35 U.S.C. 154(b) by 403 days.

(21) Appl. No.: 12/487,507

(22) Filed: Jun. 18, 2009

(65) Prior Publication Data

US 2009/0316100 A1  Dec. 24, 2009

(30) Foreign Application Priority Data

Jun. 18, 2008 (JP) .................................. 2008-159570

(51) Int. Cl.
*G02F 1/1343* (2006.01)
*G02F 1/1333* (2006.01)

(52) U.S. Cl. ........ 349/143; 349/146; 349/141; 349/158; 349/38

(58) Field of Classification Search .................. 349/143, 349/146, 141, 158, 38
See application file for complete search history.

(56) References Cited

U.S. PATENT DOCUMENTS

| 7,508,463 | B2 * | 3/2009 | Tai et al. | 349/48 |
| 7,671,930 | B2 * | 3/2010 | Lin | 349/39 |
| 7,755,710 | B2 * | 7/2010 | Wang et al. | 349/48 |
| 2009/0185125 | A1 | 7/2009 | Hida et al. | |

FOREIGN PATENT DOCUMENTS

JP    2007-183299    7/2007

OTHER PUBLICATIONS

U.S. Appl. No. 12/350,347, filed Jan. 8, 2009, Hida et al.

\* cited by examiner

*Primary Examiner* — Mike Qi
(74) *Attorney, Agent, or Firm* — Oblon, Spivak, McClelland, Maier & Neustadt, L.L.P.

(57) ABSTRACT

A liquid crystal display device includes first and second substrates and a liquid crystal layer interposed therebetween. The first substrate includes first and second electrodes separated by an insulation interlayer provided for each pixel. The second electrode has a plurality of slits. An alignment of liquid crystal molecules of the liquid crystal layer is controlled by operation of first and second transistors to control an electric field between the first and second electrodes. The first transistor includes a drain electrode coupled to the first electrode, and the second transistor includes a drain electrode coupled to the second electrode. The second transistor is switched in synchronization with the first transistor.

20 Claims, 9 Drawing Sheets

LIQUID CRYSTAL DISPLAY DEVICE HAVING PARTICULAR PIXEL STRUCTURE TO DECREASE PARASITIC CAPACITANCE

CROSS-REFERENCE TO RELATED APPLICATIONS

This application is based upon and claims the benefit of priority from prior Japanese Patent Application No. 2008-159570 filed Jun. 18, 2008, the entire contents of which are incorporated herein by reference.

BACKGROUND OF THE INVENTION

1. Field of the Invention

The present invention relates generally to a liquid crystal display device, and more particularly to a liquid crystal display device driven by a lateral electric field and including picture and common electrodes formed on one substrate.

2. Description of the Related Art

Liquid crystal display devices are widely used as display devices for various kinds of equipment such as personal computers, OA equipments, and TV sets because the display devices have many advantages such as lightness, compactness and low power consumption. In recent years, the liquid crystal display device has been also used in mobile terminal equipments such as a mobile phone, a car navigation device and a game player. In the liquid crystal display device, a liquid crystal layer is held between a pair of substrates, respectively having picture electrodes and a counter electrode, and a picture is displayed by selectively passing light from a backlight unit through a modulated liquid crystal.

Recently, obtaining a high quality display characteristic, such as a wide viewing angle, has been desired in the liquid crystal display device. Particularly, a liquid crystal display device using a lateral electric field, including a fringed electric field, attracts attention. In the liquid crystal display devices using lateral electric modes such as an In-Plane Switching (IPS) mode and a Fringe Field Switching (FFS) mode, picture and common electrodes are formed on an array substrate, and molecules of the liquid crystal layer are switched by the lateral electric field.

In the liquid crystal display device, polarizers are arranged so that each of absorption axes on outer surfaces of the array and counter substrates respectively cross to achieve a normally black display mode. For example, when no voltage is applied between the substrates, a black picture is displayed. On the other hand, when a voltage is applied between the substrates, a transmittance gradually increases and a white picture is displayed.

In an active matrix type liquid crystal display device, a thin film transistor (TFT) is used as a switching element. It is well-known that unfavorable "variation of pixel voltage" occurs due to parasitic capacitance between a gate and drain regions of the TFT when the TFT switches from the "on" to the "off" state, that is, when a gate voltage to switch off the TFT is applied to its gate electrode.

In many cases, the variation of the pixel voltage cannot be made equal in all pixels of one picture, and therefore, the variation of the pixel voltage causes display defects such as a flicker phenomenon and an image persistence. In the liquid crystal display device using the lateral electric field, both the picture electrode and common electrodes are formed on the same array substrate. Accordingly, a different parasitic capacitance from that of a liquid crystal display device using a vertical electric mode, in which picture electrode and common electrodes are formed on respective of the substrates, is generated. Therefore, it is difficult to design around the variation of the pixel voltage correctly in consideration of the parasitic capacitance, which results in display defects such as the persistence or the like because of a DC voltage component applied to the liquid crystal layer when a picture is displayed.

In Japanese laid open patent application P2007-183299, a technology to decrease a parasitic capacitance which causes the persistence of the display is disclosed. A pixel electrode is laminated on a common electrode layer through an insulation layer. Consequently, the insulation layer is present between the common and pixel electrodes. The insulation layer functions as a capacitive element which easily causes image persistence. In order to suppress the image persistence, the insulation layer in portions corresponding to electrode apertures is provided with insulating layer apertures.

BRIEF SUMMARY OF THE INVENTION

The present invention has been made to address the above mentioned problems.

Thus, according to one aspect of the invention, there is provided a liquid crystal display device including: a first substrate formed of an insulative substrate, the first substrate including pixels arranged in a matrix; a second substrate; and a liquid crystal layer interposed between the first and second substrates; wherein the first substrate includes a first electrode provided for each pixel and formed on the insulative substrate, an insulation interlayer formed on the first electrode, a second electrode arranged on the insulation interlayer for each pixel, the second electrode facing the first electrode and having a plurality of slits, a first transistor including a drain electrode coupled to the first electrode, and a second transistor including a drain electrode coupled to the second electrode, the second transistor being switched in synchronization with the first transistor.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
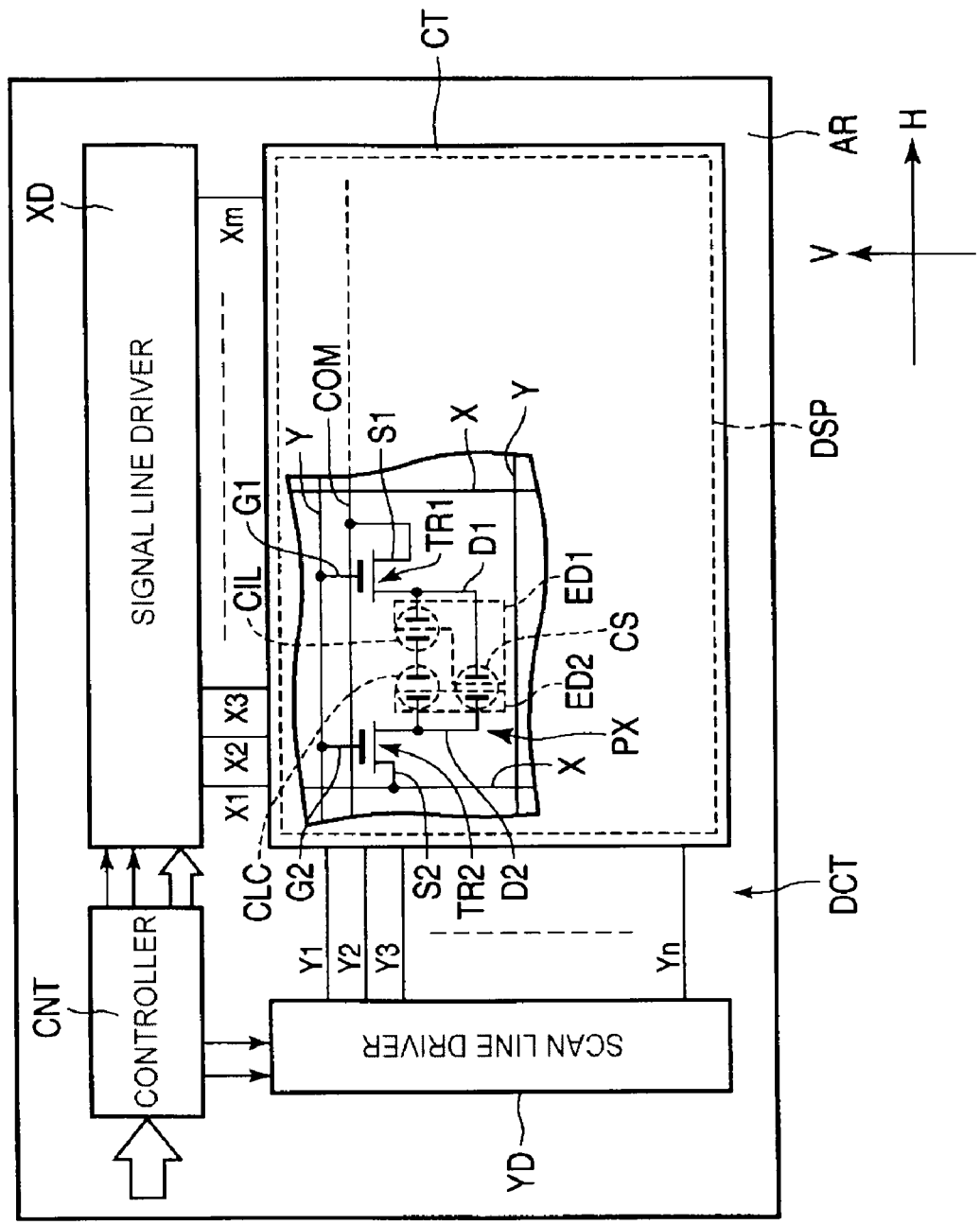
FIG. 1 is a schematic block diagram showing a liquid crystal display device using a lateral electric mode according to a first embodiment of the invention.

A liquid crystal display device according to an exemplary embodiment of the present invention will now be described with reference to the accompanying drawings wherein the same or like reference numerals designate the same or corresponding parts throughout the several views.

Figure 2:
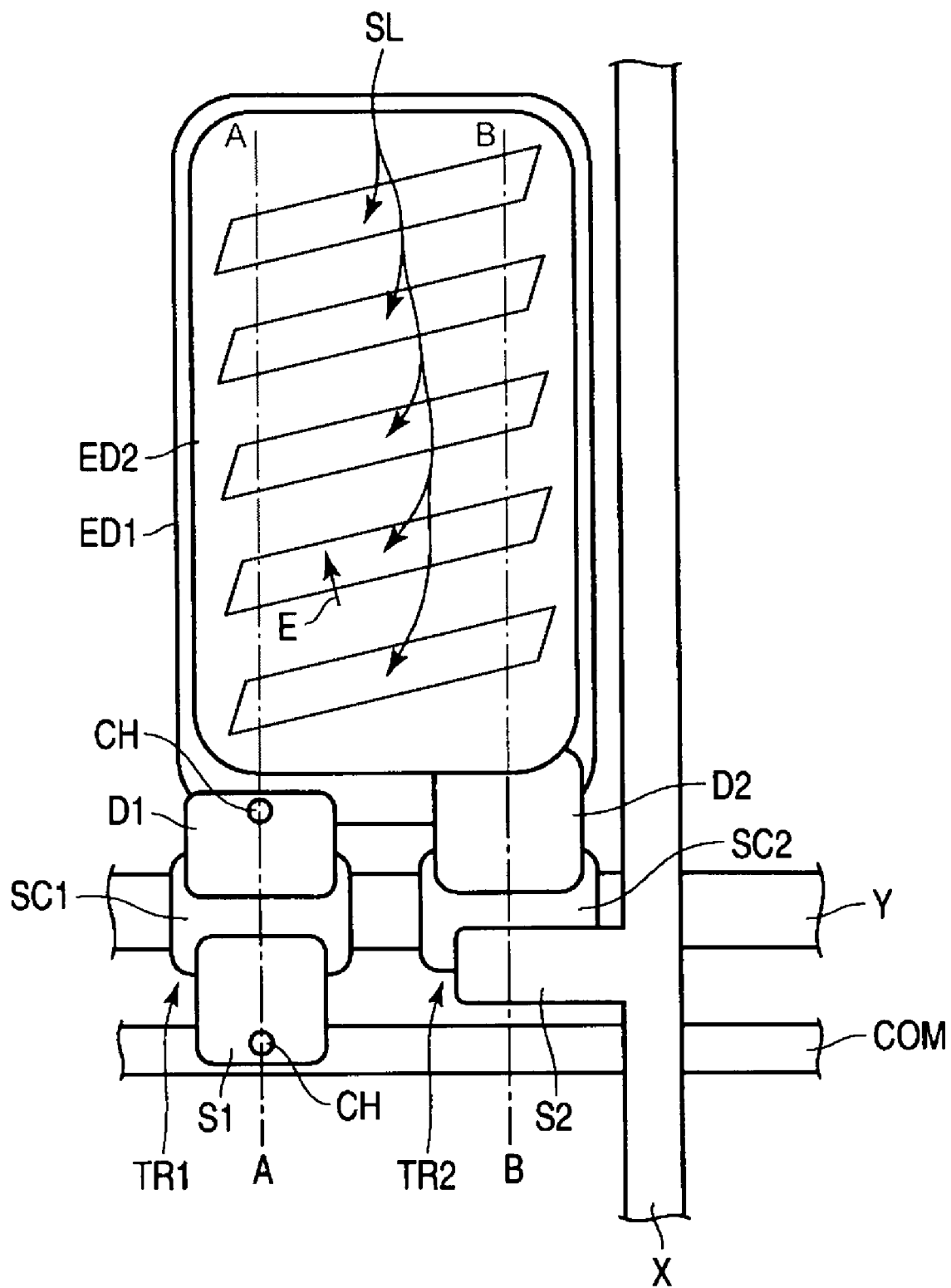
FIG. 2 is a schematic plan view showing a structure of a pixel used in the liquid crystal display device shown in FIG. 1.
Figure 3:
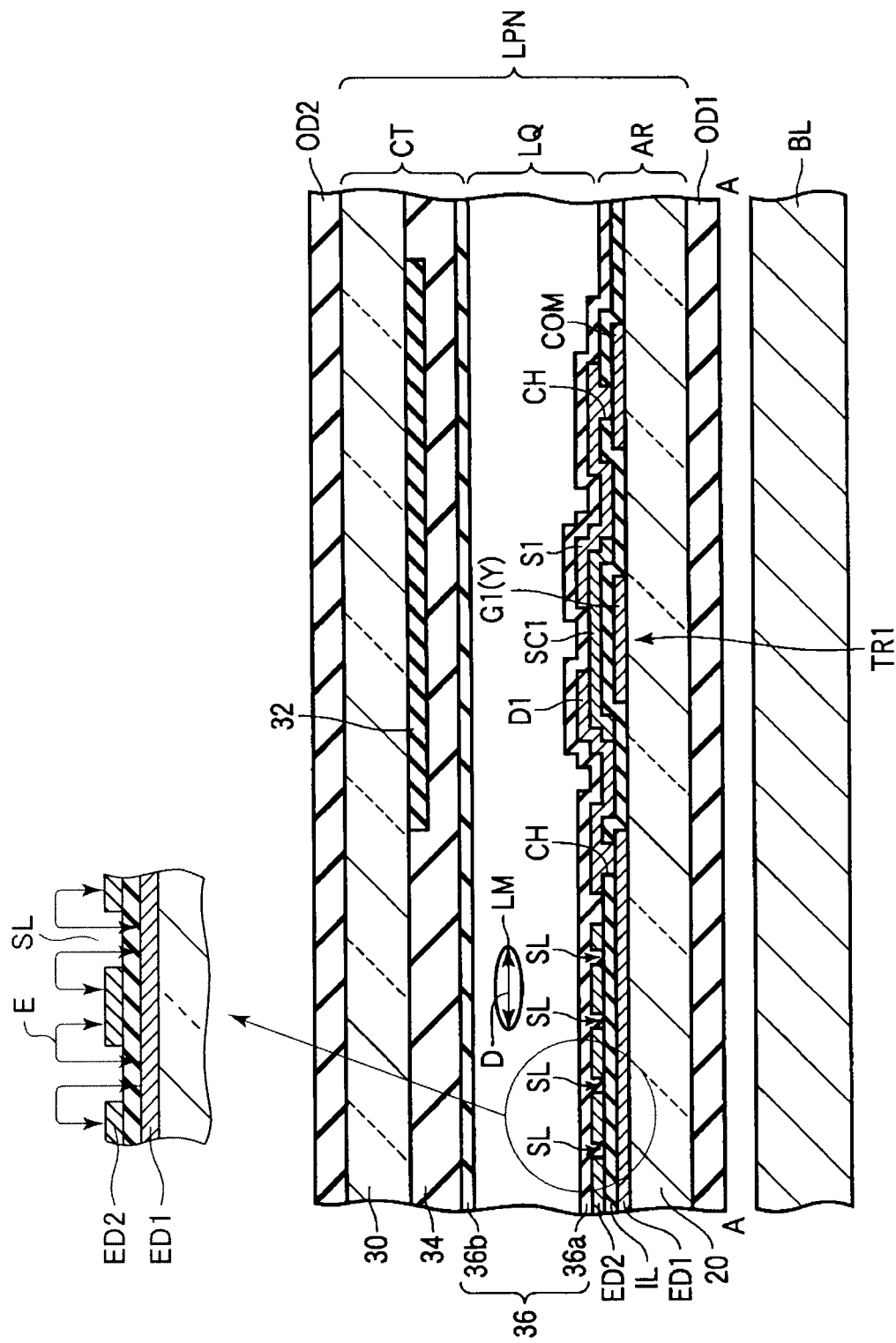
FIG. 3 is a cross sectional view showing the liquid crystal display device taken along line A-A in the plan view show in FIG. 2 according to the first embodiment of the invention.
Figure 4:
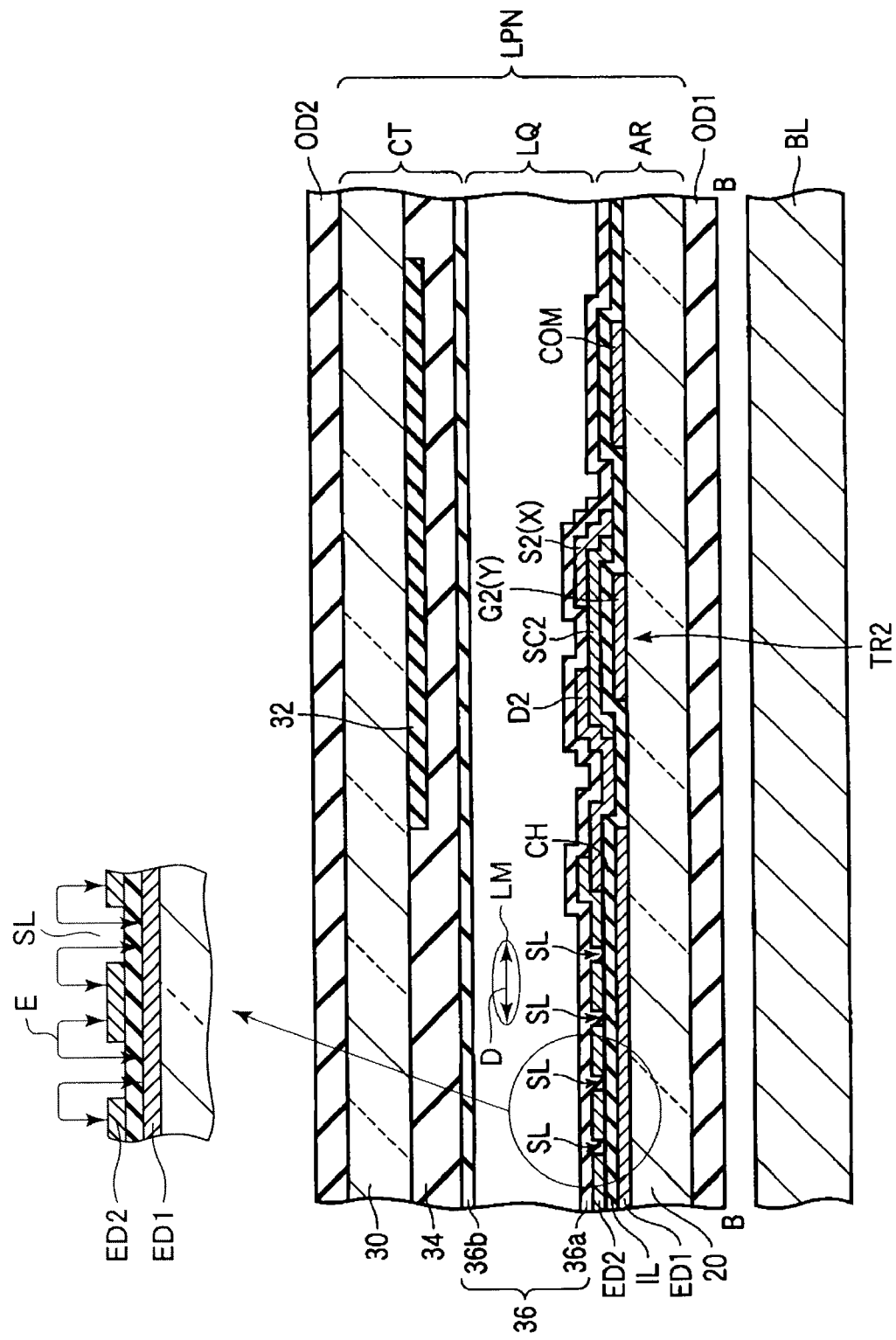
FIG. 4 is a cross sectional view showing the liquid crystal display device taken along line B-B in the plan view shown in FIG. 2 according to the first embodiment of the invention.

FIG. 1 to FIG. 4 show a first embodiment applied to a FFS mode liquid crystal display device as a lateral electric field mode, in which picture and common electrodes are arranged on the same array substrate and liquid crystal molecules are switched by using a lateral electric field (e.g. an electric field substantially in parallel with a main surface of the substrate). FIGS. 3 and 4 schematically illustrate generation of the lateral electric field, shown by E, which passes from one of the electrodes, for example ED1, through slits and to the other of the electrodes ED2.

The liquid crystal display device of an active matrix type includes a liquid crystal display panel LPN. The liquid crystal display panel LPN includes an array substrate AR (first substrate) and a counter substrate CT (second substrate) arranged opposite to the array substrate AR with a liquid crystal layer LQ interposed therebetween. The liquid crystal display panel LPN includes a display region DSP for displaying images. Further, the display region DSP includes (m×n) pixels arranged in a matrix. A back light unit is provided to illuminate the liquid crystal display panel LPN from the array substrate AR side.

The array substrate AR is formed of an insulative substrate 20 with transmissive characteristic such as a glass and a silicate glass. The array substrate AR includes n gate lines Y (Y1~Yn) arranged in a row direction H of the pixel matrix, m signal lines X (X1~Xm) arranged in a column direction V of the pixel matrix, and common lines COM arranged in the row direction H and connected to a common electrode terminal of common voltage. The array substrate AR further includes (m×n) first electrodes ED1 and second electrodes ED2 provided with each pixel, in which the first electrode ED1 faces the second electrode ED2 through an insulation interlayer IL. The gate line Y and the common line COM are arranged alternately on the insulative substrate in the row direction in parallel with each other. The gate line Y and the common line COM may be formed of the same conductive material using the same pattern in the manufacturing process. The signal line crosses with the gate line Y and the common line COM through the insulation interlayer IL.

Each gate line Y is connected to a scan line driver YD which is controlled by a controller CNT. A gate voltage supplied by the scan line driver YD is applied to the gate line Y. Each signal line X is connected to the signal line driver XD. A picture voltage which is supplied by the signal line driver XD is applied to the signal line X. The common line COM is set at a common voltage supplied by a common terminal.

The first electrode ED1 is formed in an island shape, for example, a rectangular shape, corresponding to the shape of each pixel. The first electrode ED1 is formed of conductive materials such as indium tin oxide (ITO) and indium zinc oxide (IZO) with light transmissive characteristic. The first electrode ED1 is arranged in a layer at the same level as the gate line Y and is covered with the insulation interlayer IL.

The second electrode ED 2 is arranged on the insulation interlayer IL opposite to the first electrode ED1. The second electrode ED2 is also formed in an island shape, for example, a rectangular shape, corresponding to the shape of each pixel. A plurality of slits are formed in the second electrode ED2 facing the first electrode ED1. The second electrode ED2 is also formed of conductive materials such as indium tin oxide (ITO) and indium zinc oxide (IZO) with light transmissive characteristic.

First and second transistors TR1 and TR2 are formed of thin film transistors (TFTs) having a semiconductor layer such as poly-silicon and amorphous silicon layers. The first transistor TR1 includes a source electrode S1 connected to the common line COM and a drain electrode D1 connected to the first electrode ED1. The second transistor TR2 includes a source electrode S2 connected to the signal line X and a drain electrode D2 connected to the second electrode ED2. In more detail, a gate electrode G1 of the first transistor TR1 is connected to the gate line Y. That is, the gate electrodes G1 may be formed integrally with the gate line Y or may be a part of the gate line Y. The source electrode S1 and drain electrode D1 of the first transistor TR1 are connected to source and drain regions of a semiconductor layer SC1, respectively.

The source region S1 and the drain region D1 are arranged in a layer of the same level as the signal line X and also may be formed using the same material and the same process as the signal line X. Therefore, the source electrode S1 is arranged on the insulation interlayer IL and is electrically connected to the common line COM through a contact hole CH formed in the insulation interlayer IL. Similarly, the drain electrode D1 is arranged on the insulation interlayer IL and is electrically connected to the first electrode ED1 through a contact hole CH formed in the insulation interlayer IL. That is, the first electrode ED1 for each pixel works as a common electrode and is electrically separated from the common line COM. Accordingly, a common voltage is applied to the common electrode of each pixel through the switching transistor TR1.

On the other hand, a gate electrode G2 of the second transistor TR2 is connected to the same gate line Y as the gate electrode G1 of the first transistor TR1 in the same pixel. Accordingly, the first and second transistors TR1 and TR2 in the same pixel are switched on or switched off in synchronization with a gate voltage supplied to the common gate line Y. The gate electrode G2 may be integrally formed with the gate line Y or may be a part of the gate line Y.

A source electrode S2 of the second transistor TR2 contacts a source region of a semiconductor layer SC2. A drain electrode D2 of the second transistor TR2 contacts to a drain region of a semiconductor layer SC2. The source electrode S2 and the drain electrode D2 are arranged in the same layer as the signal line X with the source electrode S1 and the drain electrode D1 of the first transistor TR1. All the source and drain electrodes are formed using the same material and the same patterning process. The source electrode S2 is arranged on the insulation interlayer IL and is electrically connected to the signal line X (or is integrally formed with the signal line X). Similarly, the drain electrode D2 is arranged on the insulation interlayer IL and is electrically connected to the second electrode ED2. That is, the second electrode ED2 works as a picture electrode for each pixel. A surface which contacts to the liquid crystal layer LQ is covered with an alignment layer 36a.

On the other hand, a counter substrate CT is formed of an insulative substrate 30 with a light transmissive characteristic. Particularly, in a color liquid crystal display device, the counter substrate CT includes a black matrix 32 formed on a surface of the insulative substrate, which faces the liquid crystal layer LQ so as to partition the pixels with respect to each other. The other color filter layer 34 is provided in each pixel surrounded by the black matrix 32. The counter substrate CT may include a relatively thick overcoat to make an unlevel surface of the color filter layer 34 smooth.

The black matrix 32 is arranged on the insulative substrate 30 opposite the wiring region such as the gate line Y, the signal line X, the common line COM and the first and second transistors TR1 and TR2. The color filter layer 34, which is formed of three colored resins such as a red colored resin, a green colored resin and a blue colored resin are arranged on the insulative substrate 30. The red, green and blue colored resins are arranged so as to face a red pixel, a green pixel and a blue pixel, respectively. The surface of the counter substrate CT, which contacts the liquid crystal layer LQ, is covered with an alignment layer 36b.

A predetermined gap between the counter substrate CT and the array substrate AR is maintained by a spacer, for example, formed of a resin integrally with either one of the substrates. The liquid crystal layer LQ is composed of liquid crystal molecules LM injected into the gap. Rubbing treatment is made to the alignment layer 36 so as to regulate the alignment direction of the liquid crystal molecules LM in the liquid crystal layer LQ. The rubbing direction of the alignment layer 36 is set so that the direction is neither parallel with nor orthogonal to a direction of a long axis of the slit SL formed in the second electrode ED2.

In the case where no voltage difference is formed between the voltages of the first electrode ED1 (e.g. common voltage) and the second electrode ED2 (e.g. picture electrode), that is, no electric field is applied between the first and second electrodes ED1 and ED2, the liquid crystal molecules LM are aligned in a direction where a long axis of the molecule is orientated in parallel with the rubbing direction of the alignment layer 36.

The liquid crystal display device includes an optical element OD1 provided on one outer surface of the liquid crystal display panel LPN, e.g. an opposite surface of the array substrate AR which contacts the liquid crystal layer LQ. Further, the liquid crystal display device includes an optical element OD2 provided on the other outer surface of the liquid crystal display panel LPN, e.g. an opposite surface of the counter substrate CT which contacts the liquid crystal layer LQ. The optical elements OD1 and OD2 include polarizers, respectively. Accordingly, a normally black mode is achieved in which a transmittance of the liquid crystal display panel LPN becomes lowest, that is, a black image is displayed in the case where no electric field is applied between the substrates.

As shown in FIG. 2, when a voltage difference between the first and second electrodes ED1 and ED2 is formed, that is, a picture voltage different from the common voltage is applied to the second electrodes ED2, an electric field E is generated between the first and second electrodes ED1 and ED2 through the slits SL. At that time, the liquid crystal molecule LM is arranged so that the long axis of the liquid crystal molecule LM is aligned from the rubbing direction to a direction in parallel with the electric field E.

As mentioned-above, when the direction of the long axis D of the liquid crystal molecules changes from the rubbing direction, the transmittance of light which passes in the liquid crystal layer LQ unit changes. Therefore, a part of light passed through the liquid crystal layer LQ passes the second optical element OD2, which enables display of a white picture. That is, in the liquid crystal display mode using the lateral electric field, the transmittance of the liquid crystal display panel LPN changes with strength of the electric field applied between the substrates. As described-above, an image is displayed by selectively passing the light from the back light unit using the lateral electric field mode.

According to this embodiment, each pixel PX includes two transistors, the first and second transistors TR1 and Tr2 whose gate electrodes G1 and G2 are connected to a common gate line Y. The drain electrodes D1 and D2 of the first and second transistors TR1 and Tr2 are connected to the first and second electrodes ED1 and ED2, respectively. The first and second transistors TR1 and Tr2 are designed to have the same electric characteristics. A total electric capacitance of the first electrode ED1 connected to the first switching transistor TR1 is set to be nearly equal in value to the total electric capacitance of the second electrode ED2.

As shown in FIG. 1 to FIG. 4, an insulation capacitance CIL is formed between the first and second electrodes ED1 and ED2 which sandwich the insulation interlayer IL in each pixel PX. That is, the electric field between the first and second electrodes ED1 and ED2 is applied to the insulation interlayer IL forming capacitance CIL. The insulation capacitance CIL is coupled to a liquid crystal capacitance CLC. Further, each pixel includes an auxiliary capacitance CS coupled in parallel with the liquid crystal capacitance CLC and the insulation capacitance CIL because the insulation interlayer IL is interposed between the first and second electrodes ED1 and ED2.

Figure 5:
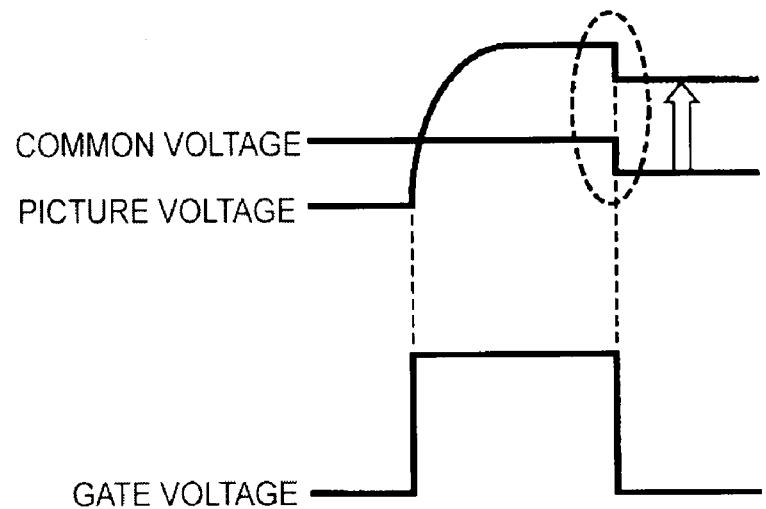
FIG. 5 is a timing chart showing a relationship among a gate voltage applied to a gate line, a picture voltage with positive polarity and a common voltage according to the first embodiment of the invention.

As shown in FIG. 5, when a picture voltage having positive polarity is written into a selected pixel, the first and second transistors TR1 and Tr2 are simultaneously switched on by a gate voltage supplied from the gate line Y and a predetermined picture voltage is supplied to the picture electrode from the signal line X. That is, a common voltage is supplied to the first electrode ED1 and a picture voltage is supplied to the second electrode ED2. Accordingly, a voltage difference is applied to the liquid crystal layer LQ.

After finishing the writing of the picture voltage into the pixel, the first and second transistors TR1 and Tr2 are simultaneously switched off. When the first and second transistors TR1 and TR2 are switched off, a variation of pixel voltage occurs. As mentioned-above, when a picture voltage of positive polarity is written into the pixel, the written picture voltage is shifted to a lower voltage than a predetermined picture voltage. However, according to the first embodiment, the common voltage is also shifted to a lower voltage than a predetermined common voltage. As a consequence, the variation of the pixel voltage of the common voltage of the first electrode ED1 and the picture electrode of the second electrode ED2 becomes nearly equal for the entire gradation because the influence to the common voltage of the first electrode ED1 and the influence to the picture voltage applied to the picture electrode of the second electrode ED2 is set to be nearly equal. That is, unfavorable "variation of a pixel voltage" is suppressed be setting parasitic capacitance between the gate and drain regions of the first and second transistors TR1 and TR2 substantially equal when the first and second transistors TR1 and TR2 switch from "on" to "off" state.

Accordingly, the voltage difference between the common voltage supplied to the first electrode ED1 through the first transistor TR1 and the picture voltage supplied to the second electrode ED2 through the second transistor TR2 becomes nearly equal even after the gate voltage is switched to the off state, that is, the first and second transistors TR1 and TR2 are simultaneously switched off.

Figure 6:
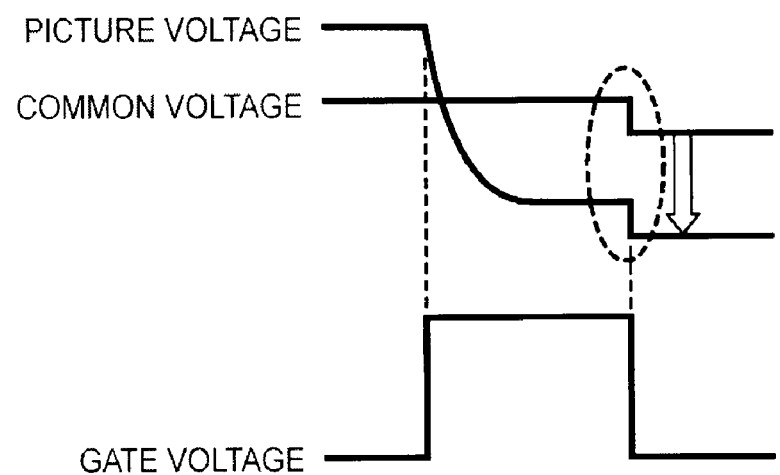
FIG. 6 is a timing chart showing a relationship among a gate voltage applied to a gate line, a picture voltage with negative polarity and a common voltage according to the first embodiment of the invention.

As shown in FIG. 6, when a picture voltage of negative polarity is written into the pixel through the second transistor TR2, the written picture voltage is shifted to a lower voltage than a predetermined picture voltage. Similarly, the common voltage is also shifted to a lower voltage than a predetermined common voltage. As a consequence, the variation of the pixel voltage of the common voltage of the first electrode ED1 and that of the picture electrode of the second electrode ED2 becomes nearly equal for the entire gradation because the influences to the common voltage of the first electrode ED1 and to the picture electrode of the second electrode ED2 are set to be nearly equal as in the case where the picture voltage with positive polarity is written.

Accordingly, the voltage difference between the voltage supplied to the first electrode ED1 through the first transistor TR1 and the voltage supplied to the first electrode ED2 through the second transistor TR2 becomes substantially the same, even in the case where the picture voltage to be written has positive polarity as shown in FIG. 5 or negative polarity as shown in FIG. 6.

According to the first embodiment, the first and second electrodes ED1 and ED2 are arranged opposite each other and are connected to the first and second transistors TR1 and TR2, respectively. In this arrangement, the first and second electrodes ED1 and ED2 have nearly equal parasitic capacitance value. Therefore, the variation of the pixel voltage of the first and second transistors TR1 and TR2 becomes almost the same regardless of the gradation to be displayed. Further, the first and second transistors TR1 and TR2 are switched on or off in synchronization each other. As a consequence, the voltage difference between the voltage supplied to the first electrode ED1 through the first transistors TR1 and the voltage supplied to the second electrode ED2 through the second transistors TR2 becomes almost the same in both the "ON" state and the "OFF" state of the transistors TR1 and TR2.

Accordingly, it becomes possible to apply a stable signal voltage to the liquid crystal layer, which results in elimination of adjustment countermeasure against flicker phenomenon. Further, a DC voltage component is not applied to the liquid crystal layer LQ for the entire gradation, which also results in a prevention of the persistence of the display. As mentioned above it becomes possible to provide a high quality display.

FIG. 7 to FIG. 10 show a second embodiment according to the invention. In the first embodiment, the first and second electrodes ED1 and ED2 correspond to the common electrode and the picture electrode, respectively. However, the first and second electrodes ED1 and ED2 correspond to the picture electrode and the common electrode, respectively, in the second embodiment.

Figure 7:
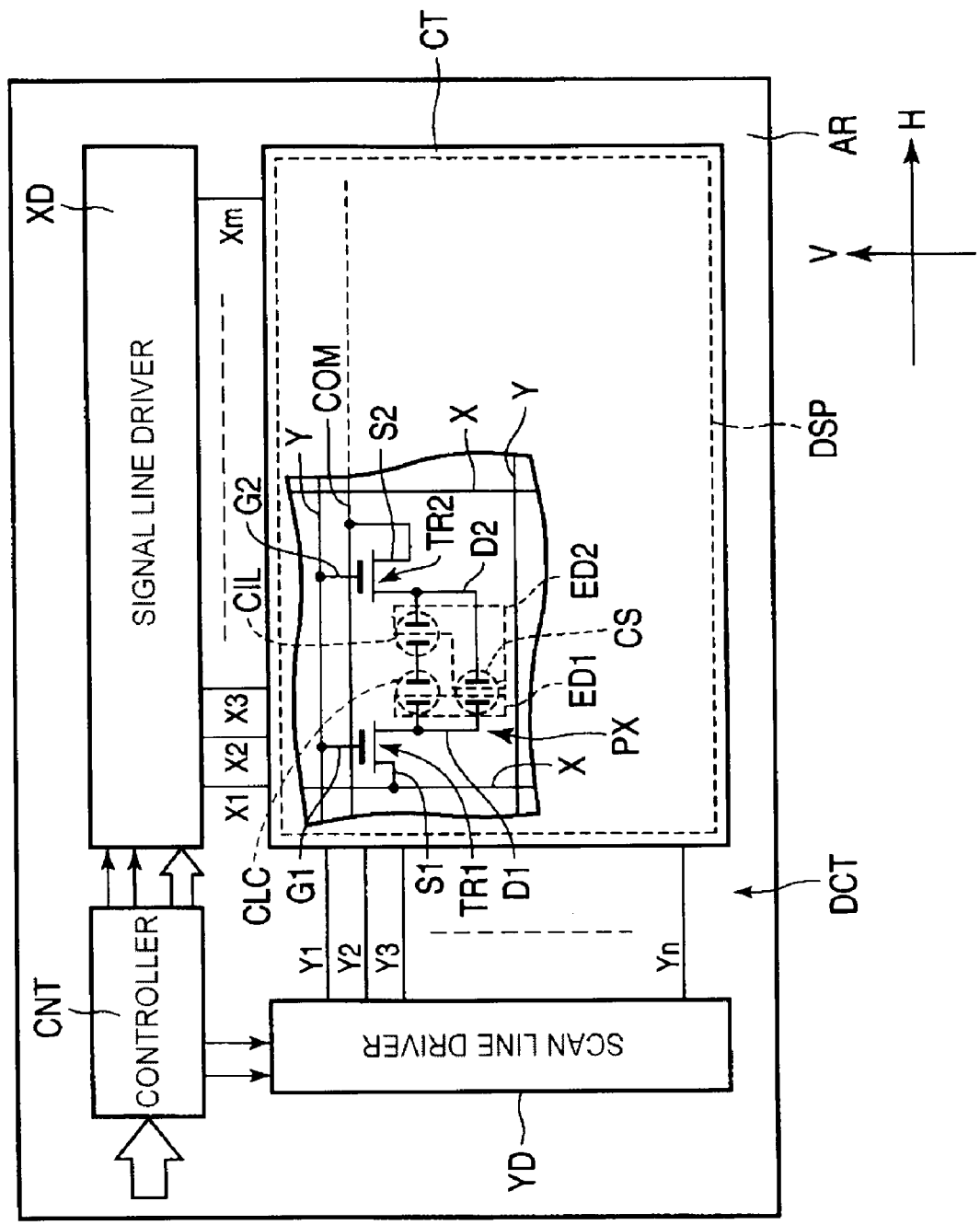
FIG. 7 is a schematic block diagram showing a liquid crystal display device using a lateral electric mode according to a second embodiment of the invention.
Figure 8:
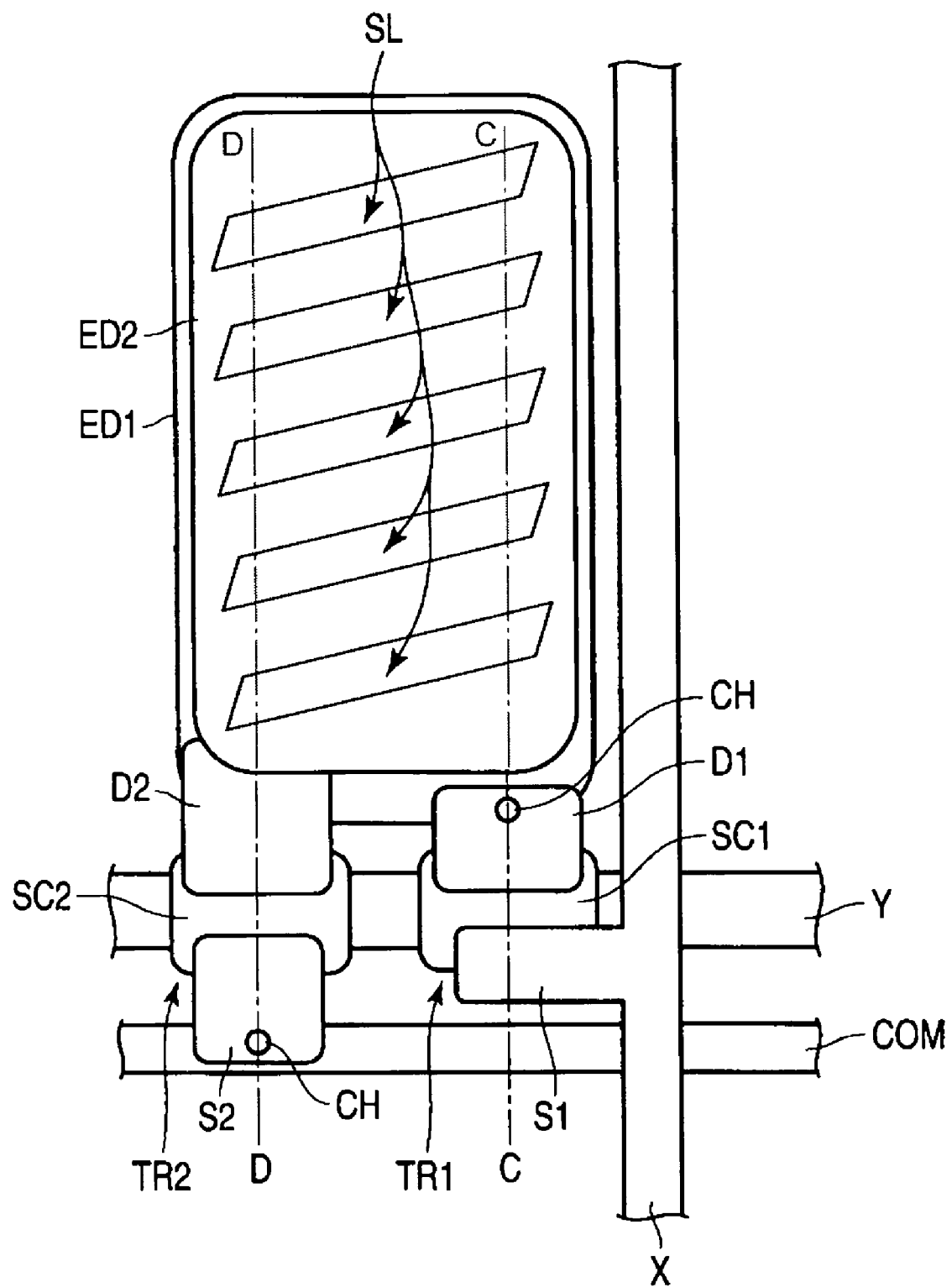
FIG. 8 is a plan view showing a structure of a pixel used in the liquid crystal display device shown in FIG. 7 according to the second embodiment of the invention.
Figure 9:
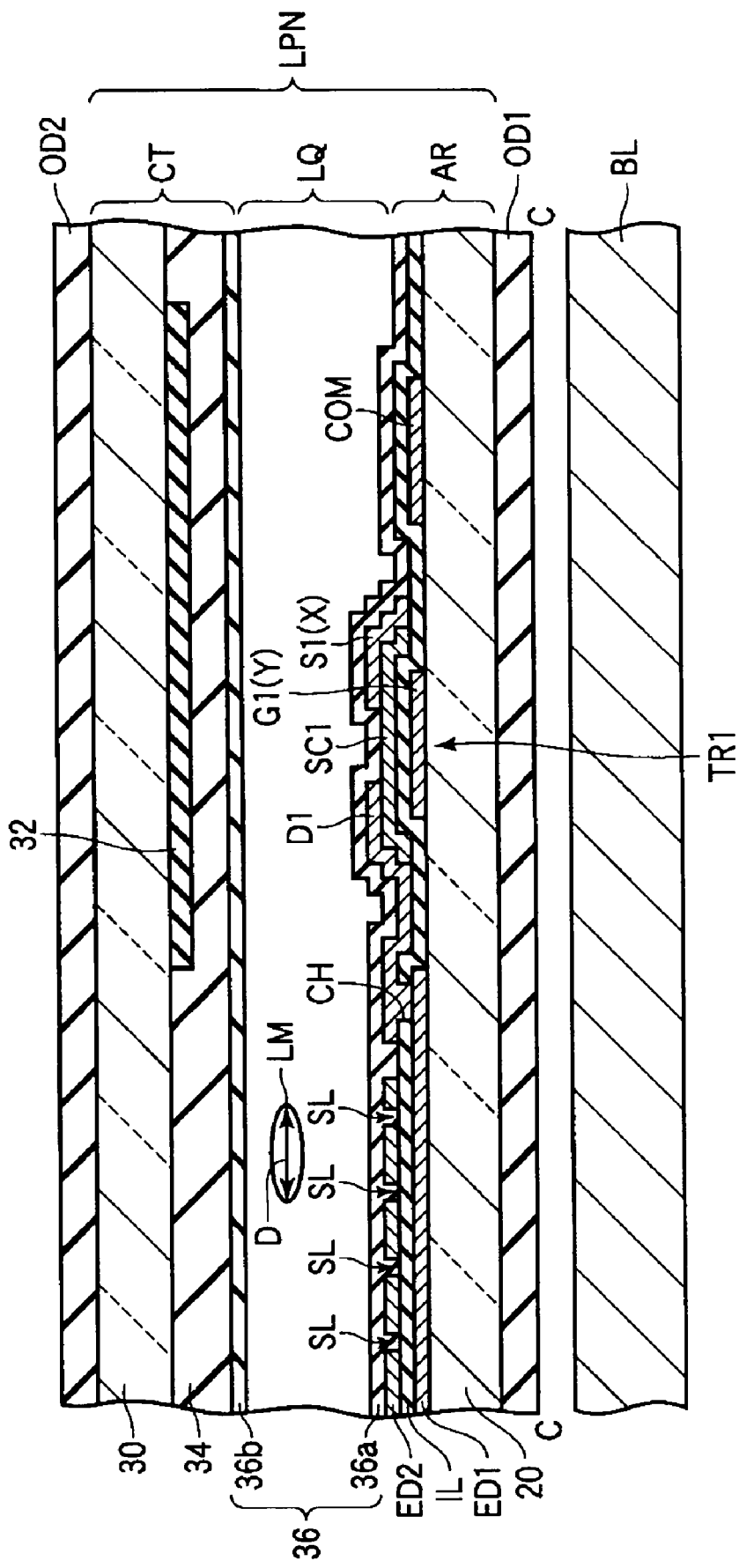
FIG. 9 is a cross sectional view showing the liquid crystal display device taken along line C-C in the schematic plan view shown in FIG. 8 according to the second embodiment of the invention.
Figure 10:
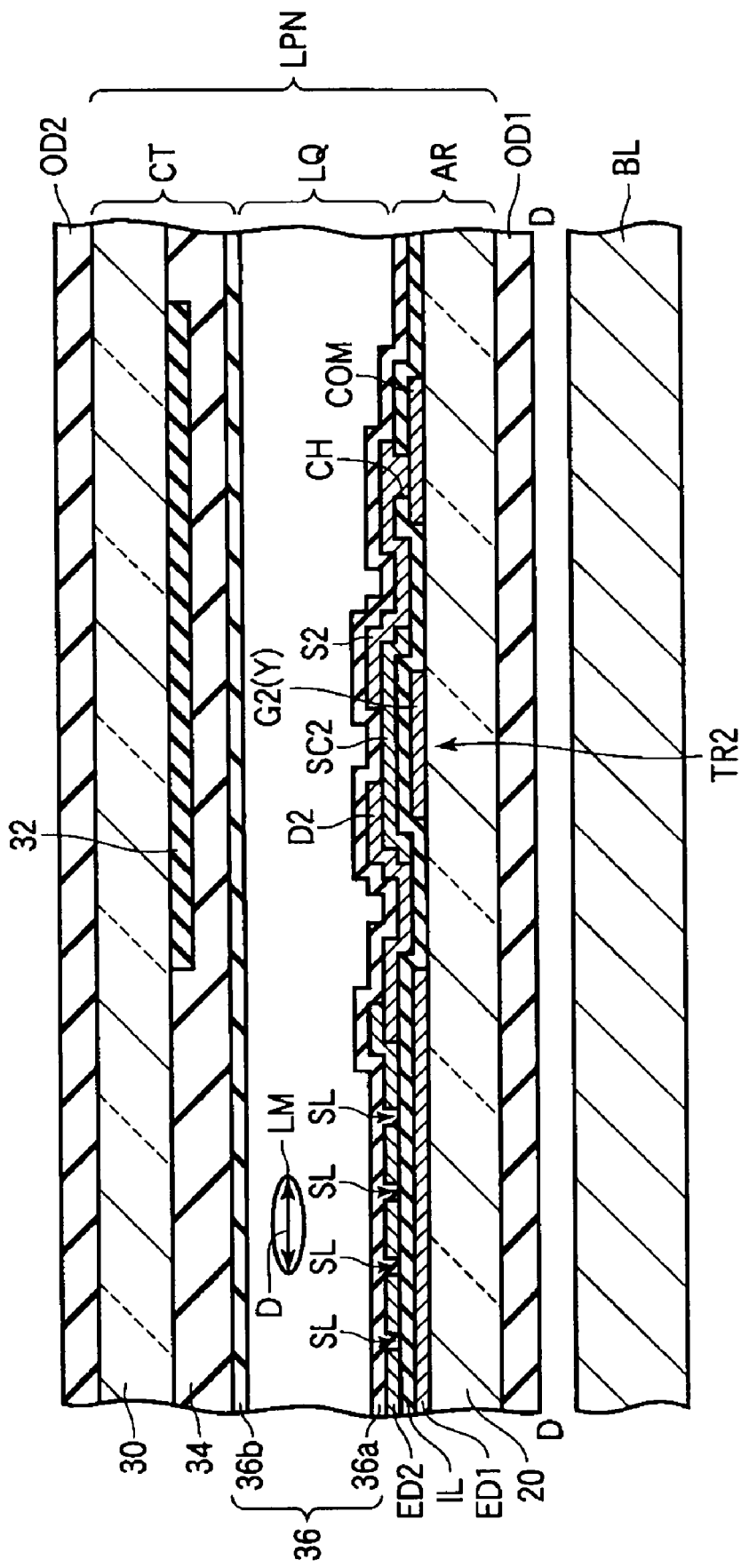
FIG. 10 is a cross sectional view of the liquid crystal display device taken along line D-D in the schematic plan view show in FIG. 8 according to the second embodiment of the invention.

As shown in FIG. 7, the first transistor TR1 includes a source electrode S1 connected to a signal line X and a drain electrode D1 connected to the first electrode ED1. On the other hand, the second transistor TR2 includes a source electrode S2 connected to a common line COM and a drain D2 connected to the second electrode ED2. In more detail, a gate electrode G1 is electrically connected to a selected gate line Y. The source electrode S1 and the drain electrode D1 of the first transistor TR1 contact source and drain regions of a semiconductor layer SC1, respectively.

The source electrode S1 and the drain electrode D1 of the first transistor TR1 are arranged in a layer at the same level as the signal line X and also may be formed using the same material and the same process as the signal line X. Therefore, the source electrode S1 is arranged on an insulation interlayer IL and electrically connected to the signal line X through a contact hole CH formed in the insulation interlayer IL. Similarly, the drain electrode D1 is arranged on the insulation interlayer IL and electrically connected to the first electrode ED1 through a contact hole CH formed in the insulation interlayer IL. That is, the first electrode ED1 is electrically connected to the signal line X and functions as a picture electrode.

On the other hand, in the same pixel a gate electrode G2 of the second transistor TR2 is connected to the same gate line Y as the gate electrode G1 of the first transistor TR1. A source electrode S2 of the second transistor TR2 contacts the source region of the semiconductor layer SC2. A drain electrode D2 of the second transistor TR2 contacts to a drain region of the semiconductor layer SC2. The source electrode S2 and the drain electrode D2 are arranged in the same level as the signal line X with the source electrode S1 and the drain electrode D1. They may be formed using the same material and the same patterning process. The source electrode S2 is arranged on the insulation interlayer IL and is electrically connected to the common line COM. Similarly, the drain electrode D2 is arranged on the insulation interlayer IL and is electrically connected to the second electrode ED2. That is, the second electrode ED2 works as a common electrode.

In this second embodiment, the same effect as the first embodiment can be obtained. Accordingly, it becomes possible to apply a stable signal voltage to the liquid crystal layer, which results in elimination of countermeasure against flicker phenomenon. Further, a DC voltage component is not applied to the liquid crystal layer for the entire gradation, which also results in a prevention of display persistence. As mentioned above it becomes possible to provide a high quality display.

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined. It is to therefore be understand that within the scope of the appended claims, the present invention may be practiced other than as specifically disclosed herein.

What is claimed is:

1. A liquid crystal display device comprising:
   a first substrate formed of an insulative substrate, the first substrate including pixels arranged in a matrix;
   a second substrate; and
   a liquid crystal layer interposed between the first and second substrates;
   wherein the first substrate includes,
      a first electrode provided for each pixel and formed on the insulative substrate,
      an insulation interlayer formed on the first electrode,
      a second electrode arranged on the insulation interlayer for each pixel, the second electrode facing the first electrode and having a plurality of slits,
      a first transistor including a drain electrode coupled to the first electrode, and a second transistor including a drain electrode coupled to the second electrode, the second transistor being switched in synchronization with the first transistor.

2. The liquid crystal display device according to claim 1, wherein the first substrate includes a signal line to supply a picture voltage and a common line arranged so as to cross with the signal line and to supply a common voltage, and
wherein the picture and common voltages are applied between the first and second electrodes.

3. The liquid crystal display device according to claim 1, wherein the first substrate includes a gate line which intersects with a signal line, and the first and second transistors include gate electrodes commonly connected to the gate line.

4. A liquid crystal display device comprising:
a first substrate formed of an insulative substrate, the first substrate including pixels arranged in a matrix;
a second substrate; and
a liquid crystal layer interposed between the first and second substrates;
wherein the first substrate includes,
a first electrode provided for each pixel and formed on the insulative substrate,
an insulation interlayer formed on the first electrode,
a second electrode arranged on the insulation interlayer for each pixel, the second electrode facing the first electrode and having a plurality of slits,
a first transistor including a drain electrode coupled to the first electrode and a source electrode,
a second transistor including a drain electrode coupled to the second electrode and a source electrode, the second transistor being switched in synchronization with the first transistor,
a common line to supply a common voltage to the first electrode through the first transistor, and
a signal line to supply a picture voltage to the second electrode through the second transistor.

5. The liquid crystal display device according to claim 4, wherein the common line is arranged so as to cross with the signal line and the respective source electrodes of the first and second transistors are connected to the common line and the signal line.

6. The liquid crystal display device according to claim 4, wherein the first substrate includes a gate line which intersects with the signal line, and the first and second transistors include gate electrodes commonly connected to the gate line.

7. The liquid crystal display device according to claim 4, wherein the common line is arranged in the same layer as the first electrode,
wherein the source and drain electrodes of the first transistor are respectively coupled to the common line and the first electrode through respective contact holes formed in the insulation interlayer.

8. The liquid crystal display device according to claim 4, wherein each of the source and drain electrodes of the first and second transistors are formed of the same conductive layer.

9. A liquid crystal display device comprising:
a first substrate formed of an insulative substrate, the first substrate including pixels arranged in a matrix;
a second substrate; and
a liquid crystal layer interposed between the first and second substrates;
wherein the first substrate includes,
a first electrode provided for each pixel and formed on the insulative substrate,
an insulation interlayer formed on the first electrode,
a second electrode arranged on the insulation interlayer for each pixel, the second electrode facing the first electrode and having a plurality of slits,
a first transistor including a drain electrode coupled to the first electrode and a source electrode,
a second transistor including a drain electrode coupled to the second electrode and a source electrode, the second transistor being switched in synchronization with the first transistor,
a signal line to supply a picture voltage to the first electrode through the first transistor, and
a common line to supply a common voltage to the second electrode through the second transistor.

10. The liquid crystal display device according to claim 9, wherein the common line is arranged so as to cross with the signal line, and the source electrodes of the first and second transistors are respectively connected to the signal line and common line.

11. The liquid crystal display device according to claim 9, wherein the first substrate includes a gate line which intersects with the signal line, and the first and second transistors include gate electrodes commonly connected to the gate line.

12. The liquid crystal display device according to claim 9, wherein the common line is arranged in the same layer as the first electrode, and
wherein the drain electrode of the first transistor and the source electrode of the second transistor are respectively coupled to the first electrode and the common line through respective contact holes formed in the insulation interlayer.

13. The liquid crystal display device according to claim 9, wherein each of the source and drain electrodes of the first and second transistors are formed of the same conductive layer.

14. A liquid crystal display device comprising:
a first substrate formed of an insulative substrate, the first substrate including pixels arranged in a matrix;
a second substrate; and
a liquid crystal layer interposed between the first and second substrates;
wherein the first substrate includes,
a first electrode provided for each pixel and formed on the insulative substrate,
an insulation interlayer formed on the first electrode,
a second electrode arranged on the insulation interlayer for each pixel, the second electrode facing the first electrode and having a plurality of slits,
a first transistor including a drain electrode coupled to the first electrode, and
a second transistor including a drain electrode coupled to the second electrode, the second transistor being switched in synchronization with the first transistor,
a common line to supply a common voltage to the first electrode through the first transistor, and
a signal line to supply a picture voltage to the second electrode through the second transistor,
wherein parasitic capacitances formed between the gate electrode and drain electrode of respective first and second transistors are set so that electric influence to the common voltage of the first electrode and the picture voltage of the second electrode is substantially the same and that after a common voltage and a picture voltage have been written into the first and second electrodes, respectively, the written picture and common voltages are shifted to voltages which are each lowered by a same voltage amount at a timing when the first and second transistors are switched off.

15. The liquid crystal display device according to claim 14, wherein the common line is arranged so as to cross with the signal line, and repective source electrodes of the first and second transistors are respectively connected to the common and signal lines.

16. The liquid crystal display device according to claim 14, wherein the first substrate includes a gate line which intersects with the signal line, and the first and second transistors include gate electrodes commonly connected to the gate line.

17. The liquid crystal display device according to claim 14, wherein the common line is arranged in the same layer as the first electrode, and wherein source and drain electrodes of the first transistor are coupled to the common line and the first electrode through a contact hole formed in the insulation interlayer, respectively.

18. The liquid crystal display device according to claim 14, wherein each of source and drain electrodes of the first and second transistors are formed of a same conductive layer.

19. A liquid crystal display device comprising:
a first substrate formed of an insulative substrate, the first substrate including pixels arranged in a matrix;
a second substrate; and
a liquid crystal layer interposed between the first and second substrates;
wherein the first substrate includes,
a first electrode provided for each pixel and formed on the insulative substrate,
an insulation interlayer formed on the first electrode,
a second electrode arranged on the insulation interlayer for each pixel, the second electrode facing the first electrode and having a plurality of slits,
a first transistor including a drain electrode coupled to the first electrode, and
a second transistor including a drain electrode coupled to the second electrode, the second transistor being switched in synchronization with the first transistor,
a signal line to supply a picture voltage to the first electrode through the first transistor,
a common line to supply a common voltage to the second electrode through the second transistor,
wherein parasitic capacitances formed between the gate electrode and drain electrode of respective first and second transistors are set so that electric influence of the parasitic capacitance to the picture voltage of the first electrode and the common voltage of the second electrode is substantially the same and that after the picture voltage and the common voltage have been written into the first and second electrodes, respectively, the written picture and common voltages are shifted to voltages lowered by substantially a same voltage amount at a timing when the first and second transistors are switched off.

20. The liquid crystal display device according to claim 19, wherein the common line is arranged so as to cross with the signal line, and wherein respective source electrodes of the first and second transistors are connected to the signal line and common line, respectively, and wherein the first substrate includes a gate line which intersects with the signal line, and the first and second transistors include gate electrodes commonly connected to the gate line.

* * * * *